US007661389B2

(12) United States Patent
Tuerk (10) Patent No.: US 7,661,389 B2
(45) Date of Patent: Feb. 16, 2010

(54) AQUACULTURE CAGE WITH VARIABLE BUOYANCY SPARS

(76) Inventor: Jeffrey E. Tuerk, 6271 R.R. #1, Mindemoya, Highway #452, ON (CA) P0P 1S0

( * ) Notice: Subject to any disclaimer, the term of this patent is extended or adjusted under 35 U.S.C. 154(b) by 164 days.

(21) Appl. No.: 11/377,585

(22) Filed: Mar. 17, 2006

(65) Prior Publication Data

US 2006/0207516 A1 Sep. 21, 2006

Related U.S. Application Data

(60) Provisional application No. 60/662,786, filed on Mar. 18, 2005, provisional application No. 60/735,833, filed on Nov. 14, 2005.

(51) Int. Cl.
*A01K 61/00* (2006.01)
(52) U.S. Cl. .................... 119/223; 119/215
(58) Field of Classification Search ............ 119/215, 119/223, 123, 256, 264–267; 114/123, 256, 114/264–267
See application file for complete search history.

(56) References Cited

U.S. PATENT DOCUMENTS

| 1,761,365 | A | * | 6/1930 | Reed ................ 43/102 |
| 4,244,323 | A | | 1/1981 | Morimura |
| 4,257,350 | A | | 3/1981 | Streichenberger |
| 4,351,268 | A | * | 9/1982 | Blair et al. ........... 119/223 |
| 4,380,213 | A | * | 4/1983 | Blair et al. ........... 119/223 |
| 4,395,970 | A | * | 8/1983 | Kunkle et al. ......... 119/240 |
| 5,007,376 | A | | 4/1991 | Loverich et al. |
| 5,193,481 | A | | 3/1993 | Loverich et al. |
| 5,359,962 | A | | 11/1994 | Loverich |
| RE34,971 | E | | 6/1995 | Loverich et al. |
| 5,655,938 | A | | 8/1997 | Huguenin et al. |
| 5,845,602 | A | | 12/1998 | Kaarstad |
| 5,926,998 | A | | 7/1999 | Nelson |
| 5,967,086 | A | | 10/1999 | Knott |
| 6,062,170 | A | | 5/2000 | Finch et al. |
| 6,386,146 | B1 | | 5/2002 | Knott |
| 6,443,660 | B1 | * | 9/2002 | Smith et al. .......... 405/224 |
| 6,481,378 | B1 | * | 11/2002 | Zemach ............... 119/223 |
| 6,581,543 | B1 | | 6/2003 | Kolberg |
| 2004/0123809 | A1 | | 7/2004 | Klein |

FOREIGN PATENT DOCUMENTS

| CA | 1076359 | 4/1980 |
| CA | 1337894 | 9/1996 |

* cited by examiner

*Primary Examiner*—David J Parsley
(74) *Attorney, Agent, or Firm*—L. Anne Kinsman; Borden Ladner Gervais LLP (57) ABSTRACT

A buoyancy control system for a fish cage used in fish farming. The buoyancy system comprises spars having first and second sections separated by a bulkhead. The first section is filled with air and hermetically sealed from the second section and from the surrounding environment. The second section is sealable and may be filled with air or water to adjust the buoyancy of the spar. A fish cage having the buoyancy control system can be raised or lowered in accordance to the amount of air and water in the second sections of the spars. A segmented anchor can connected at each spar.

7 Claims, 11 Drawing Sheets

AQUACULTURE CAGE WITH VARIABLE BUOYANCY SPARS

CROSS-REFERENCE TO RELATED APPLICATIONS

This application claims the benefit of U.S. Provisional Application No. 60/662,786, filed Mar. 18, 2005, and U.S. Provisional Application No. 60/735,833, filed Nov. 14, 2005, the contents both of which are incorporated herein in their entirety.

FIELD OF THE INVENTION

The present invention relates generally to pens and cages for fish farming. More particularly, the present invention relates to fish pens and cages having variable buoyancy spars.

BACKGROUND OF THE INVENTION

Known fish cages tend to be expensive, relatively complex assemblies that are difficult to displace and offer little or no control in the ascent or descent rate of the cage. The lack of control in the ascent/descent rate of the cage can be quite harmful and even deadly to fish species sensitive to rapid changes of pressure and/or temperature.

An offshore fish farming apparatus, including a semi-submersible platform with a series of silos to hold fish, is disclosed in Canadian Patent No. 1,337,894 to Langlie. The platform includes openings into which the fish silos can be placed. The height adjustment of the fish silos can be controlled by a lifting device disposed on the platform and connected to the silos. The height adjustment of the silos can further be controlled by controlling the depth of the platform by flooding or pumping out buoyancy columns equipped with bilge pumps. This patent does not address the issue of the importance of the ascent/descent rate of the fish silos.

Another apparatus used in aquaculture is disclosed in U.S. Pat. No. 4,257,350 to Steichenberger. The apparatus disclosed therein is that of a fish pen or series of fish pens that can be partially or completely submerged. It also describes the use of constant-buoyancy tanks and variable-buoyancy tanks, the latter adapted to be filled with either air or water. However, as in the Langlie patent, this patent does not address the issue of the importance of the ascent/descent rate of the fish pen.

Yet another apparatus for fish farming is disclosed in U.S. Patent Application Publication No. 2004/0123809 to Klein relating to a fish-breeding apparatus, which comprises a frame supporting one or a plurality of breeding cages. The apparatus is provided with hollow buoyancy elements and means for controlling the buoyancy of the apparatus by filling, totally or partially, the buoyancy elements with water and emptying them of water, totally or partially, whenever desired. The ascent/descent rate of the Klein fish-breeding apparatus is controllable but complicated in that anchors, cables and pulleys are required.

Therefore, it desirable to provide a variable buoyancy fish pen that is easy to assemble, displace and operate while offering improved control in its ascent/descent rate.

SUMMARY OF THE INVENTION

It is an object of the present invention to obviate or mitigate at least one disadvantage of previous fish pens or cages.

The present invention provides a buoyancy system for a fish cage for aquaculture and fish farming. The buoyancy system comprises at least one variable buoyancy spar having a fixed buoyancy section and a variable buoyancy section, which is sealable.

The present invention also provides a method of assembling a fish cage. The method comprises a step of interlinking variable buoyancy sections of substantially horizontally floating variable buoyancy spars followed by a step of decreasing a buoyancy of the variable buoyancy sections of the spars, thereby causing a sinking of the variable buoyancy sections of the spars. A final step of interlinking constant buoyancy sections of the spars is also performed.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein.

DETAILED DESCRIPTION

For the purpose of the description, the appellations fish cage and fish pen are used interchangeably. The term fish includes any type of marine life that can be husbanded in a submerged or partially submerged enclosure.

The present invention is that of a buoyancy control system for a fish cage, the buoyancy system comprising at least one variable buoyancy spar having a fixed buoyancy chamber, and a variable buoyancy chamber that is sealable. The sealable variable buoyancy chamber allows controlled rising and lowering of the fish cage.

Figure 1:
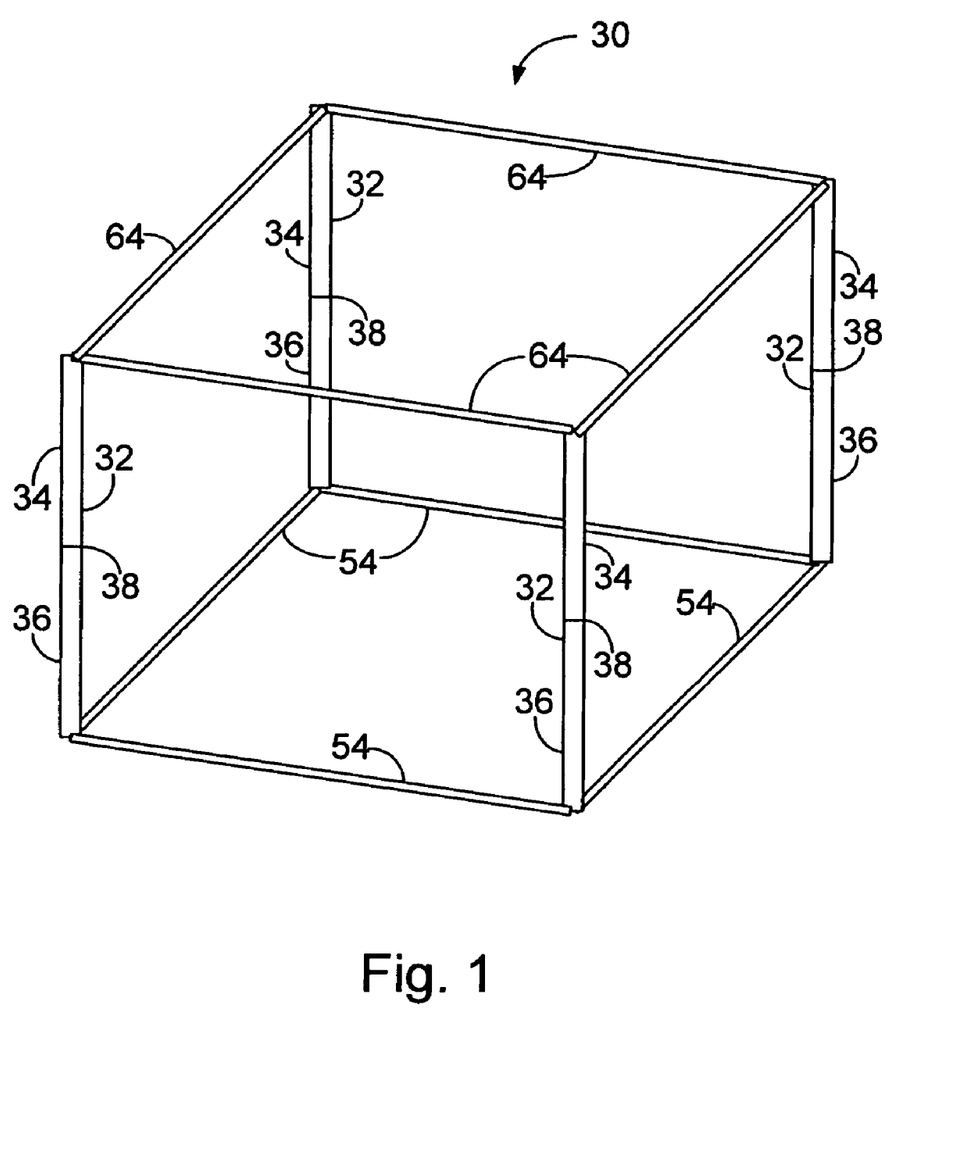
FIG. 1 is a perspective view of a fish cage according to an embodiment of the present invention.

An embodiment of the fish cage 30 is shown in FIG. 1. Spars 32 are connected by interlinking members 54 and 64. Although the number of spars 32 shown in FIG. 1 is four, the present invention includes fish cages having any number of spars 32. Netting, cage bars or other containment means (not shown) can be attached to the spars 32 to cover the bottom, the top and the sides of the fish cage 30, as appropriate for the particular farming activity and species contained within the cage.

Figure 2A:
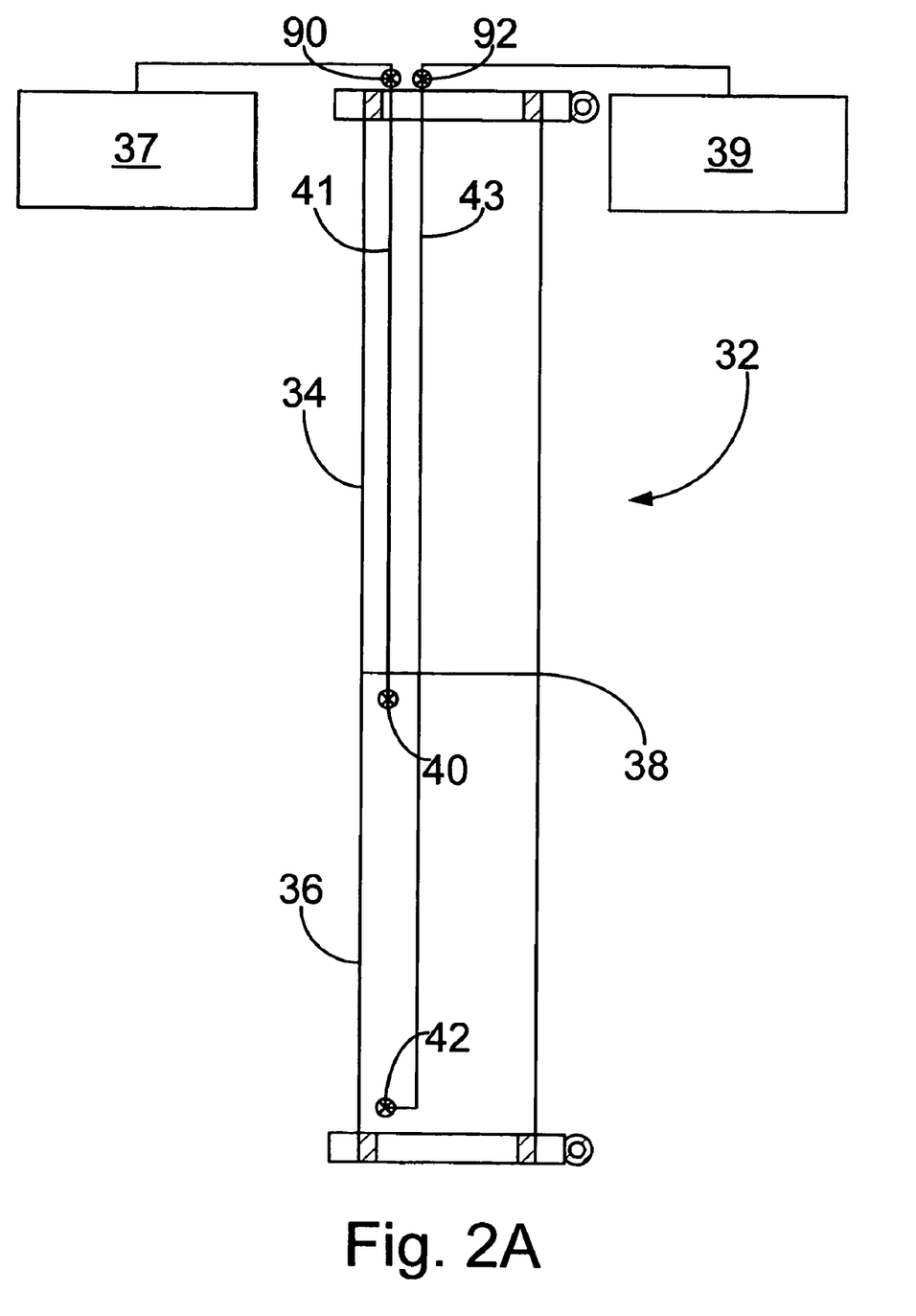
FIG. 2A is a side view of a spar according to an embodiment of the present invention.

As shown in FIG. 1, and in greater detail in FIG. 2a, each spar 32 can include a first section 34 separated from a second section 36 by a bulkhead 38. The second section 36 can be provided with any number of fittings such as an air fitting 40 and a water fitting 42. The fittings can permit ingress or egress of air, water or other fluids to/from the interior of the second section 36 to fill or partially fill the second section 36. As shown in FIG. 2A, the air fitting 40 is connected to an air source 37 by a first hose 41. The air source 37 can include an air vent and/or an air compressor or any other means to effect air transfer to or from the second section 36. Also shown in FIG. 2A is the water fitting 42 connected to a water source 39 by a second hose 43. The water source 39 can include a water vent and/or a water pump or any other means to effect water transfer to or from the second section 36. Although hoses 41 and 43 are shown, any appropriate conduits can be used. The hoses 41 and 43 can be removably connected to the air and water sources through any appropriate connection such as valves or fittings 90 and 92. The hoses 41 and 43 can run along the spar 32 up to the top of the spar 32, and be fixed to the spar through any appropriate means. Alternatively, instead of running along the spar 32, the hoses 41 and 43 connected to the fittings 40 and 42 can be attached to floating umbilical lines, which can extend to the water shore or float on the water surface where an operator can access them.

To fill the second section 36 with water, the water source 39 pumps water into the second section 36 through the hose 43 while air in the second section 36 is forced out through the air fitting 40 and the hose 41. To empty the second section 36 of water, the water source 39 pumps water out through the water fitting 42 and the hose 43 while air is allowed in the second section 36 through the hose 41 and the air fitting 40. Alternatively, the air source 37 can be used to force air into the second section 36, thereby pushing out water through the water fitting 42 and the hose 43.

While filling the second sections 36 of the spars 32 with water, the fish cage 30 lowers in the water. Once a predetermined depth has been reached, the filling of the second section 36 with water is stopped and the second section 36 can be hermetically isolated from its surrounding environment by valves 90 and 92. At this point, the water and air sources 39 and 37 can be disconnected from the hoses 43 and 41. The second section 36 being sealable, or at least not being exposed to the water pressure surrounding it, permits the pressure inside the second section 36 to remain substantially constant regardless of the depth at which the spars 32 are immerged or submerged. The importance of this feature is illustrated below.

The advantage of having a spar 32 with a sealable second section 36 (or a second section 36 not being exposed to the water pressure surrounding it) compared to an equivalent spar with an unsealed second section, i.e. a second section exposed to the water pressure surrounding it, is as follows. As is known, water pressure increases with distance from the water surface. As an example, for fresh water, the water pressure gradient is approximately 0.433 pounds per square in inch per foot (psi/ft). A spar 32 having its second section 36 filled with water, sealed, e.g. by closing valves 90 and 92, and allowed to sink to a given depth does not experience an increase in the pressure of the water contained in the second section 36 as the spar sinks in the water. However, an equivalent spar with an unsealed second section filled with water and allowed to sink to the same given depth will see the pressure of the water contained in its second section increase from what it was closer to the surface.

Figure 2B:
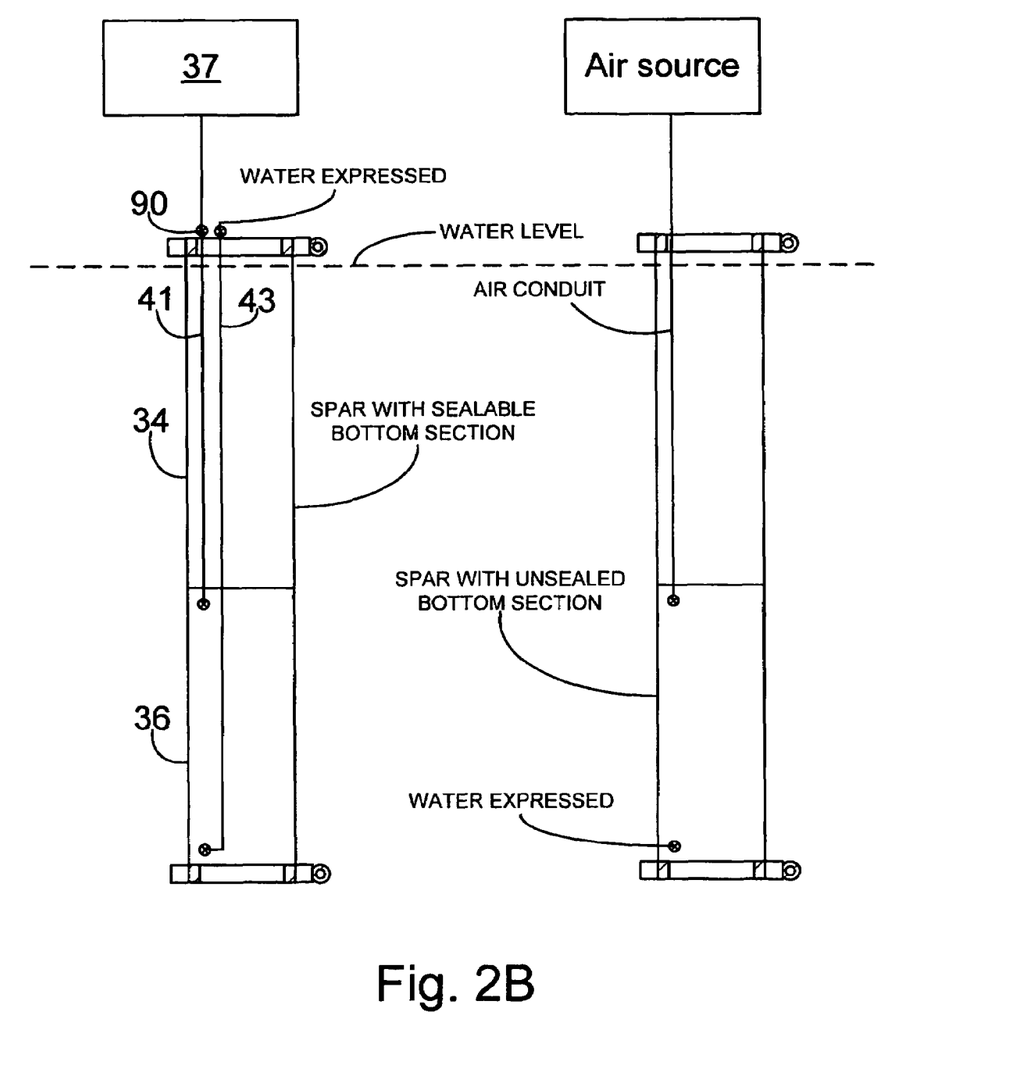
FIG. 2B is a side view of a spar with an unsealed second section together with the spar of FIG. 2A.

Thus, as will be understood by a skilled worker, connecting an air source to the second section 36 through the hose 41 and introducing air into the second section 36 to push out water from the second section 36 through the hose 43 is easier than introducing air to remove water from the unsealed second section simply because the water pressure in the second section 36 is lower than that in the unsealed second section. This is illustrated in FIG. 2B where an embodiment of a spar of the present invention is shown partially submerged next to a spar having an unsealed second section. In the case where the air source 37 connected to the spar 34 and the air source connected to the spar with the unsealed second section generate air flows at the same pressure, the rate of expression of water from the second section 36 of spar 34 is greater than the rate of expression of water from the unsealed second section.

Additionally, since the water pressure inside the unsealed second section decreases as the spar rises, for a constant air pressure provided by an air source connected to the second section, the rate of expression of water from the second section will increase as the spar rises. This is not the case with the spar 32 whose rate of expression of water will not be affected by the depth at which lies the second section 36. Thus, the spar with the unsealed second section rises faster than the spar with the sealable second section 36. Fish cages using such spars tend to pop out of the water since their ascent rate is not easy to control. Alternatively said, the ascent rate of the a fish cage having spars with a sealable second section 36 according to the present invention is easier to control than that of a fish cage having spars with unsealed second sections.

The same type of analysis can be made with respect to the lowering of a fish cage having spars with sealable second sections 36 and a fish cage having an unsealed second section. For a constant water input rate, the fish cage having the unsealed second section will sink faster than a the fish cage having spars with a sealable second section 36 according to the present invention.

As stated previously, controlled raising and lowering of the fish cage 30 is particularly important in situations where fish contained in the cage or pen can easily be killed by rapid changes in pressure such as those that occur when raising the fish to the surface too rapidly.

The entire first section 34, or a portion of the first section 34, can contain air or any other type of gas and be hermetically sealed from the surrounding environment. The spars first section 34 and second section 36 can include hollowed cylinders. The first section can also include a buoyant material.

Figure 3:
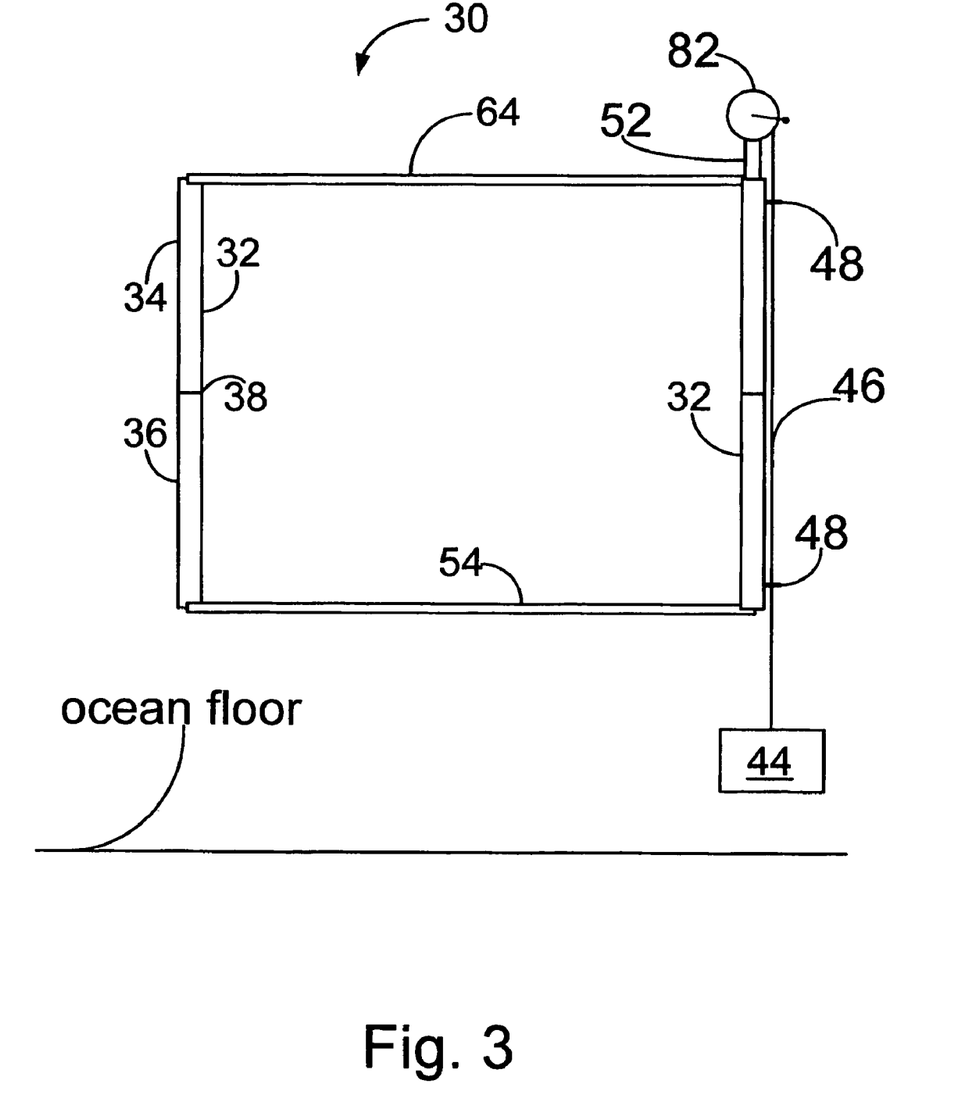
FIG. 3 is a side view of a fish cage with an anchor according to an embodiment of the present invention.
Figure 4:
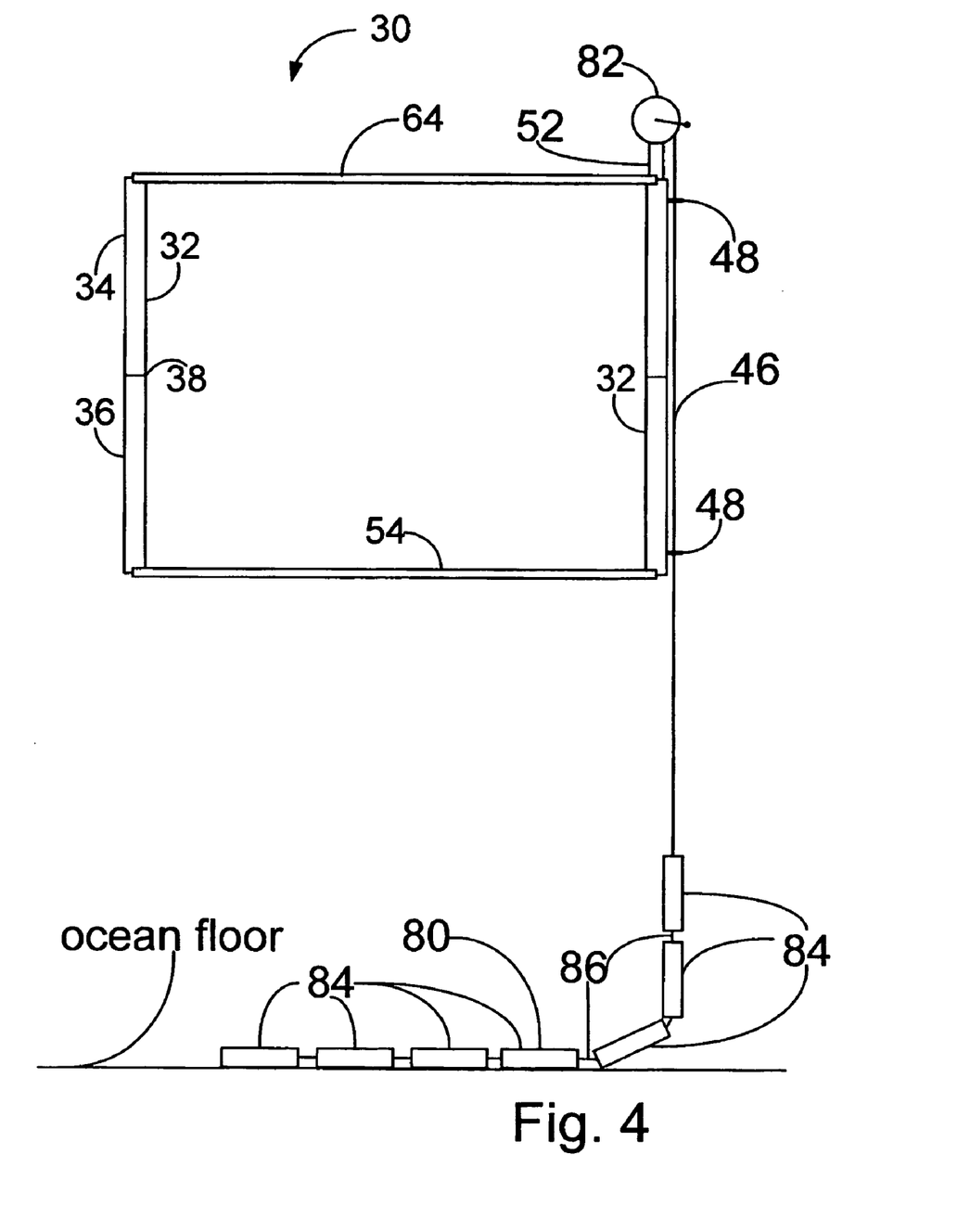
FIG. 4 is a side view of a fish cage with a segmented anchor according to an embodiment of the present invention.

Some or all of the spars 32 can be attached to anchors such as anchor 44 shown in FIG. 3. Alternately or additionally, anchors such as a segmented anchor 80 shown in FIG. 4 can be used. In the case where a spar 32 has an anchor 44 or a segmented anchor 80, a cable 46 attached to anchor 44 or segmented anchor 80 can be guided alongside the spar 32 through a guiding means, such as a guide eye 48. Alternatively, the cable 46 can be attached directly to the spar 32 (not shown). The end of the cable opposite the anchor can be attached to a winch 82 such as shown in FIGS. 3 and 4 where the winch 82 is disposed on a winch post 52 at the first section of the spar 32. The winch 82 allows for adjustment of the depth of the anchor. In practice, when the fish cage 30 is at its desired location, the anchors are lowered onto the ocean floor to prevent drifting of the fish cage 30. To move the fish pen 30, the anchors 44 or segmented anchors 80 can be lifted off the ocean floor by the winch 82 and the fish cage 30 towed to another location. As would be understood by a worker skilled in the art, the cable winch 82 can be hand-operated or motorized. The winch 82 can also be on a service boat (not shown) and connected to the cable 46 upon servicing of the fish cage 30.

The advantages of an anchor such as the segmented anchor 80 are twofold. In practice, one-piece anchors such as anchor 44 can become stuck to the ocean floor particularly when the ocean floor is muddy or silty. On the other hand, anchors such as segmented anchor 80 are less prone to this effect. Another advantage provided by segmented anchors such as the segmented anchor 80 is that they allow for greater control in the ascent/descent rate of the fish cage 30. For example, when a fish cage is anchored to the ocean floor with segmented anchors 80 having a plurality of links 84 lying on the ocean floor, the ascent rate of the fish pen will decrease each time a link 84 is lifted off the ocean floor. This repeated decrease in the ascent rate is not possible with non-segmented anchors such as the anchor 44. As mentioned above, a controlled ascent rate is particularly important in situations where fish contained in the cage or pen can easily be killed by rapid changes in pressure such as those that occur when raising the fish cage to the surface too rapidly.

The segmented anchor 80 can simply be a chain of the type used for anchoring sea vessels. The segmented anchor 80 can also be made of solid material links 84 articularly attached to each other with linking means 86 such as, for example, chain links. The material used for the links 84 can include cement or any other solid material denser than water.

Figures 5A, 5B:
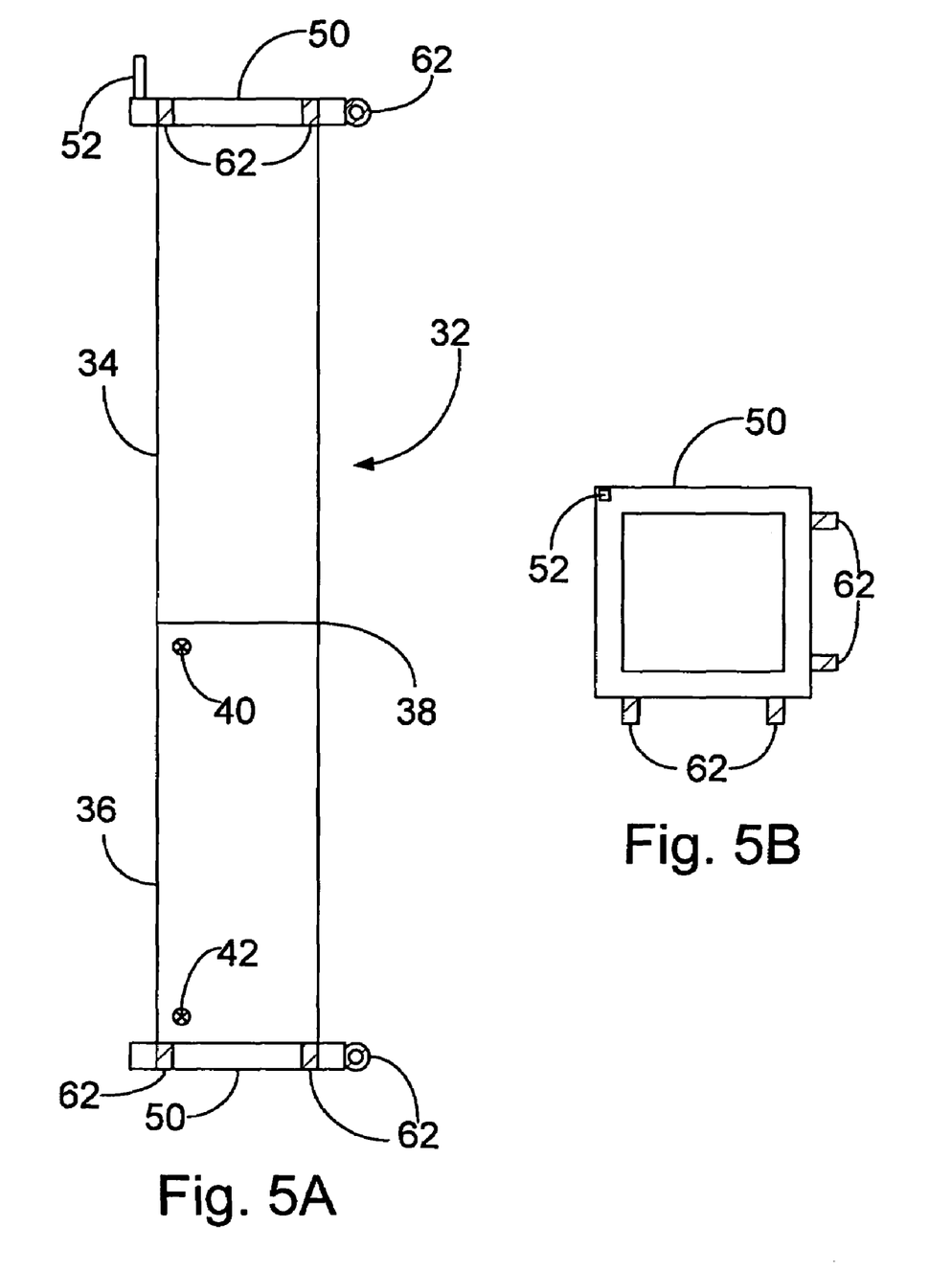
FIG. 5A is a side view of a spar with hinge assemblies according to an embodiment of the present invention.
FIG. 5B is a top view of a hinge assembly according to an embodiment of the present invention.

The spars 32 can each include two hinge assemblies 50 affixed to the spar through known means. As shown in FIG. 5A, a first hinge assembly 50 can be affixed in the top region of the spar 32 and another hinge assembly 50 in the bottom region the spar 32. The first hinge assembly 50 is shown with a winch post 52, which is for receiving a winch such as the winch 82 shown in FIGS. 3 and 4. FIG. 5B shows a top view of the hinge assembly 50 disposed at the top region of the spar 32.

Figure 6A:
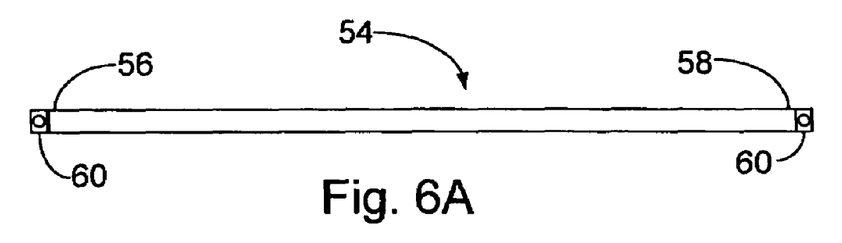
FIG. 6A is a side view of an interlinking member according to an embodiment of the present invention.
Figure 6B:
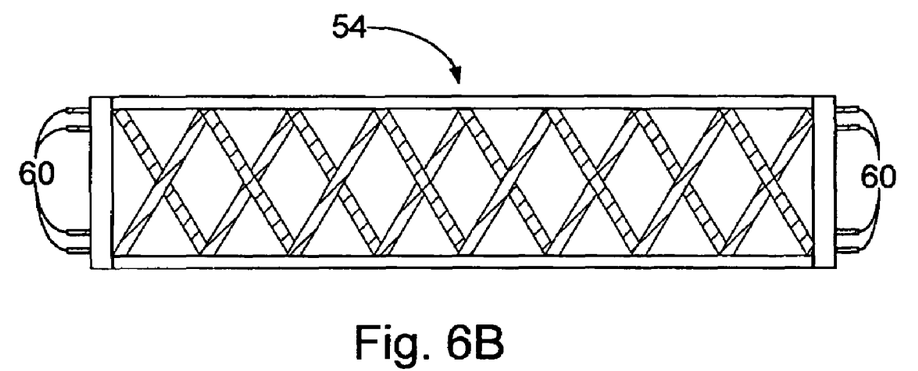
FIG. 6B is a top view of an interlinking member according to an embodiment of the present invention.

The spars 32 can be linked together at their second sections 36 by interlinking members 54 depicted in the example of FIGS. 6A and 6B, FIG. 6A being a side view and FIG. 6B being a top view of the interlinking member 54. Shown in FIGS. 6A and 6B are end regions 56 and 58 formed to cooperate with the spar hinge assemblies 50 of FIG. 5. In the end regions 56 and 58 can be bored flanges 60 for mating with or fastening to bored protrusions 62 of the hinge assembly 50. Any appropriate fastener (not shown) can be used to pivotally attach bored flanges 60 to bored protrusions 62. Any other known means for attaching interlinking members to hinged assemblies can also be used.

Figure 7:
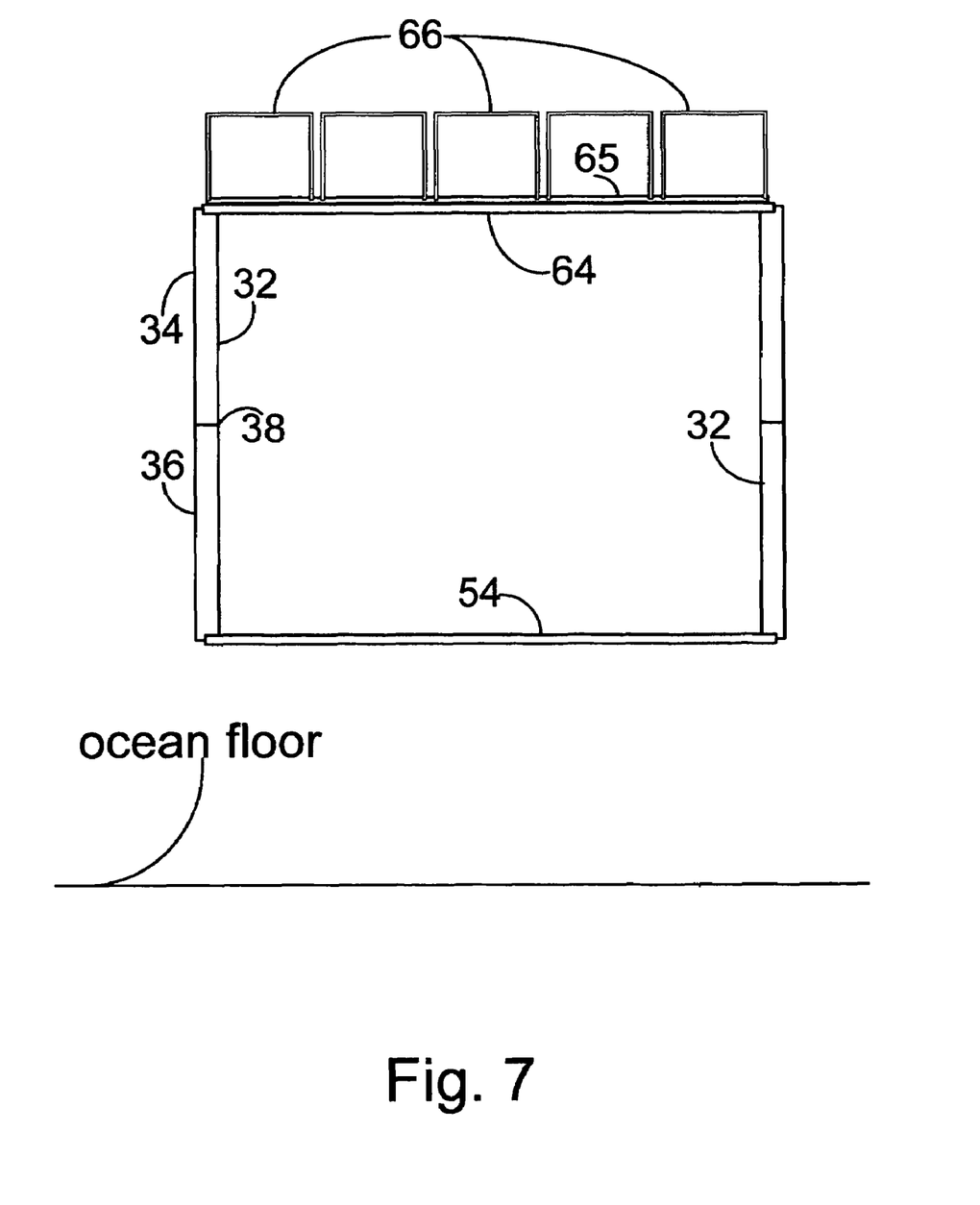
FIG. 7 is a side view of a fish cage including a walkway and a railing according to an embodiment of the present invention.

Similarly, interlinking members 64, which can be the same as interlinking members 54, can be used to interlink the first sections 34 of the spars 32. Further, as shown in FIG. 7, the interlinking members 64 can be provided with a walkway 65 and railing segments 66 such that a worker attending the fish pen 30 can safely move about. The railing segments 66 can be held to the interlinking member 64 through known means such as by inserting the railing segments 66 into sockets integral with the interlinking members 64 or affixed to the interlinking members.

Figure 8:
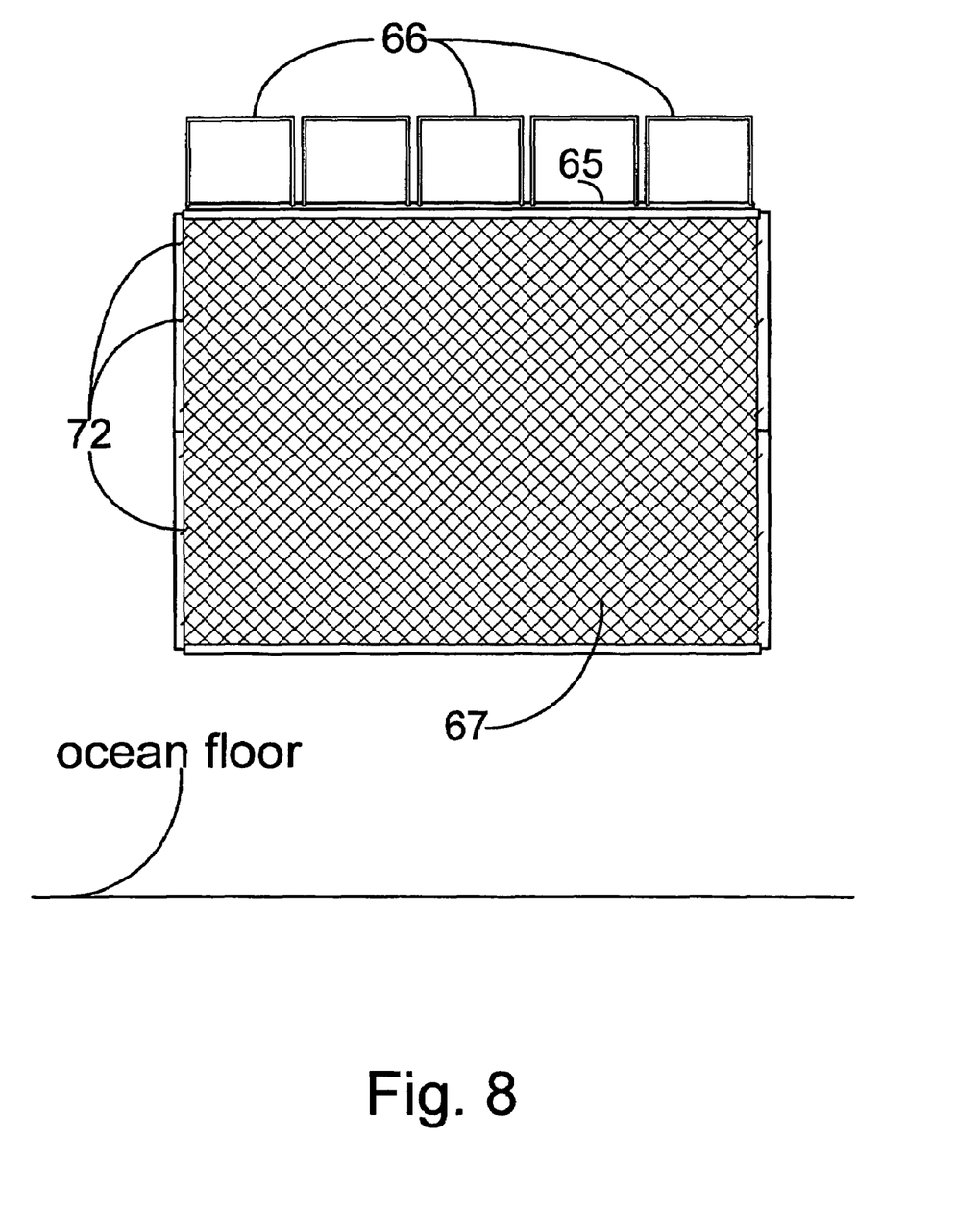
FIG. 8 is a side view of a fish cage including a walkway, a railing and a net according to an embodiment of the present invention.

A netting means 67 shown in FIG. 8 can be used to cover the open sides and bottom of the fish cage 30. The netting means can be attached to spars 32 with ties (not shown) going through the netting means and through loops 72 and to interlinking members 54 and 64 with ties or other known fastening means. A retractable netting means (not shown) can be provided on the top open side of the fish pen 30 thus allowing the fish cage 30 to be completely submerged with minimum risk of fish escaping. This feature can provide some protection against rough weather for fish pens located below the water surface. The fish pen can be equipped with an automatic feeding means as is known in the art. It is to be understood that fish pen 30 may be used in aquaculture in general and not only in fish farming.

Figure 9:
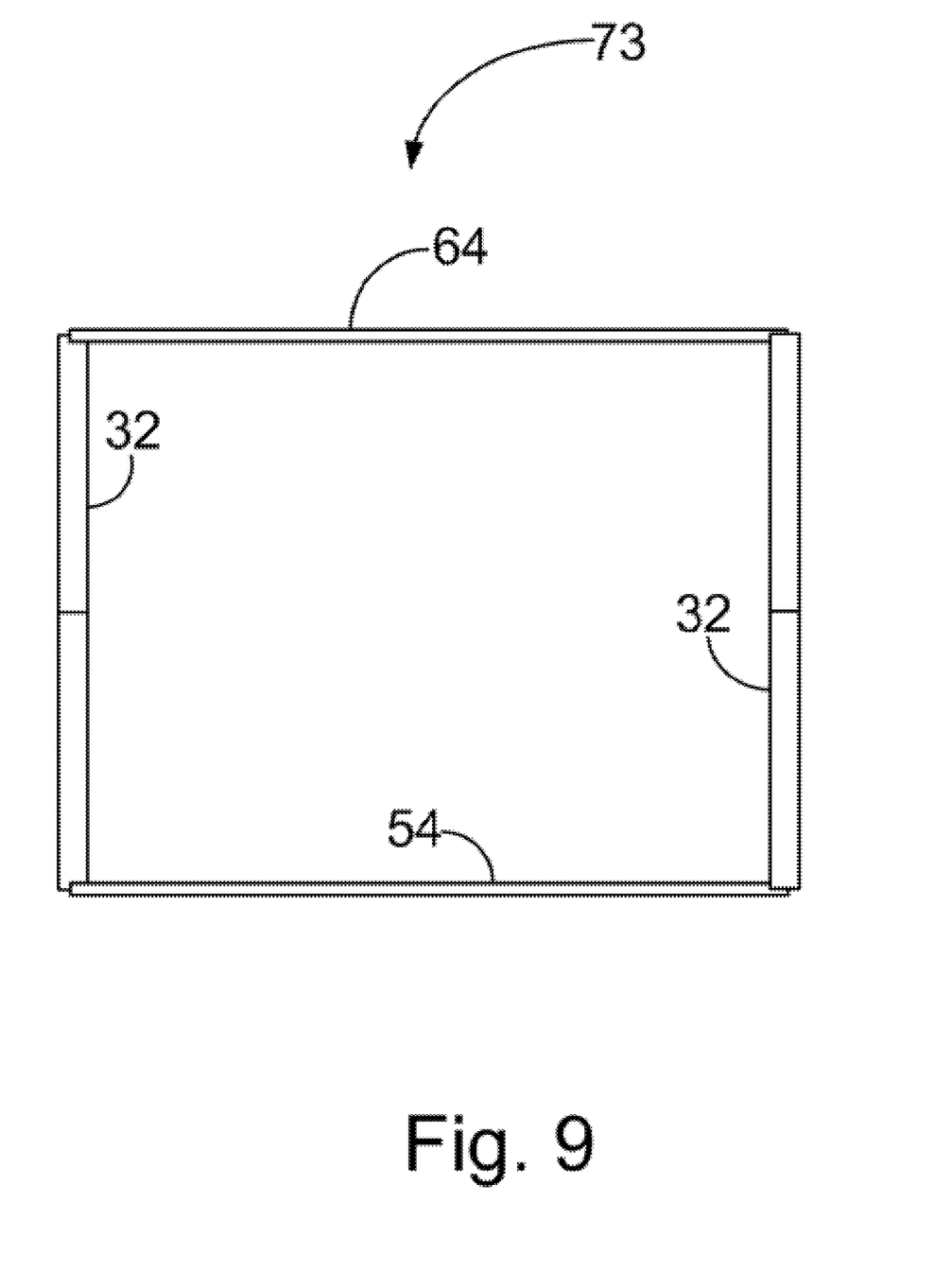
FIG. 9 is a side view of a fish cage sub-assembly according to an embodiment of the present invention; and, FIG. 10 is a perspective view of a partially assembled fish cage according to an embodiment of the present invention.

The fish cage 30 can be assembled on the water. Spars 32, with both first and second sections initially filled with air and floating horizontally, are brought to an assembly area. In the case of a four-spar cage, a first interlinking member 64 is used to link first sections 34 of a first pair of spars 32 and a second interlinking member 54 is used to link second sections 36 of the same pair. This process is repeated for the other pair of spars 32. These steps of the assembly process result in two floating, generally rectangular, fish cage sub-assemblies 73 such as shown in FIG. 9 where hinge assemblies 50 have been omitted from the figure.

Figure 10:
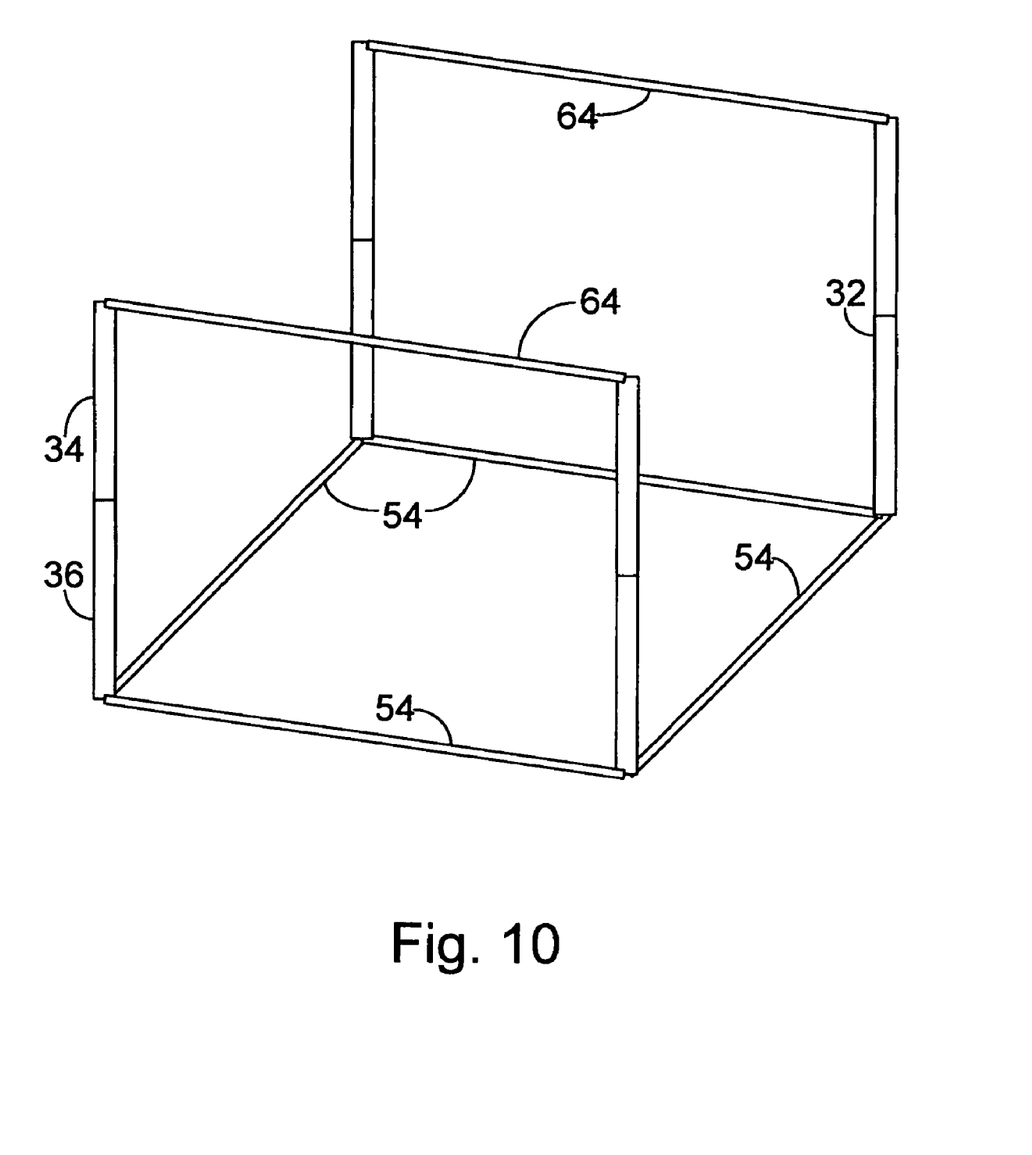

The rectangular sub-assemblies 73 are positioned with their bottom parts, i.e. the parts with the second sections 36 of the spars, facing each other. Two interlinking members 54 are then used to pivotally interlink the bottom parts of the two sub-assemblies 73 to each other. At this point of the assembly process, the second sections of each of the four spars are filled with water thus making the second section of the spars sink. Once enough water is introduced in the second sections 36, the spars 32 and the sub-assemblies 73 are partially submerged, leaving the partially built fish cage 30 looking as in FIG. 10. At this point of the assembly process, another pair of interlinking members 64 are used to interlink the top portions of the fish pen sub-assemblies thus completing the assembly of the frame of fish pen 30.

If desired, water can then be removed from the second sections of the spars and the pen raised from the water. Netting can be installed on the bottom and side faces of the fish pen. Netting can also be installed on various faces of the pen at different stages of assembly. The sub-assemblies can be assembled and interlinked to each other in shallow water and then brought in deeper water for subsequent assembly of the fish pen. Once the fish pen frame and netting are assembled, the anchors can be attached to the spars. In one particular example the anchors can first be dropped on the sea floor with buoys attached to their cables. A person can then thread the cables in guide eyes 48 towards the winch 82. The winches, water source and air source can be attached permanently or removably to the spars. Alternatively, some of these can be on a boat servicing the fish cage 30.

Thus, the cage's ability to ascend and descend with full control is a result of having a sealed variable buoyancy chamber, which eliminates the effect of varying water pressure with changes in depth. Water is pumped into the second section of the spar with a water pump and air is released to sink the cage. Conversely, air pressure is applied and water is forced out of the second section of the spars to raise the cage. Ascent/descent rates of approximately 0.5 ft/minute can be obtained.

Furthermore, non-segmented anchors 44 in the form of concrete blocks suspended from the spar have not allowed a slow ascent as it has developed suction when the lake bottom is a muddy, sand type. A large ship chain can provide the same anchor mass but not the same degree of adhesion to a muddy/silty lake bottom. The chain will also provide a "variable buoyancy break" and a staircase type ascent from the lake bottom. Other than a large ship chain, segmented anchor 80 can be a series of concrete pillars joined by chain. The pillars are less prone to suction as well and may provide more mass than individual chain links.

Thus the present invention is that of a buoyancy control system for a fish cage, the buoyancy system comprising at least one spar having a fixed buoyancy chamber and a variable buoyancy chamber, which is sealable. The sealable variable buoyancy chamber allows controlled rising and lowering of the fish cage.

The above-described embodiments of the present invention are intended to be examples only. Alterations, modifications and variations may be effected to the particular embodiments by those of skill in the art without departing from the scope of the invention, which is defined solely by the claims appended hereto.

I claim:

1. A fish cage submergible in a body of water, the fish cage comprising:
    a plurality of variable buoyancy spars having a fixed buoyancy chamber and a variable buoyancy chamber, the variable buoyancy chamber having an air fitting and a water fitting to permit ingress and egress of air and water, respectively, to and from the variable buoyancy chamber to vary the buoyancy of the of variable buoyancy chamber, the air fitting and the water fitting communicating respectively with an air valve and a water valve, the air valve and the water valve to releasably seal the variable buoyancy chamber, each variable buoyancy spar including a bulkhead separating the fixed buoyancy chamber from the variable buoyancy chamber, each variable buoyancy spar having a top region and a bottom region;
    first hinge assemblies, each variable buoyancy spar having a first hinge assembly affixed to its top region, each first hinge assembly having first bored protrusions;
    second hinge assemblies, each variable buoyancy spar having a second hinge assembly affixed to its bottom region, each second hinge assembly having second bored protrusions;
    a first set of four interlinking members each having opposite ends with bored flanges, a first pair of interlinking members of the first set linking the top regions of a first pair of variable buoyancy spars by attachment of their bored flanges to respective bored protrusions of respective first hinge assemblies, a second pair of interlinking members of the first set linking the bottom regions of a second pair of variable buoyancy spars by attachment of their bored flanges to respective bored protrusions of respective second hinge assemblies, to form a first fish cage sub-assembly and a second fish cage sub-assembly;
    a second set of two interlinking members each having opposite ends with bored flanges, each interlinking member of the second set linking a variable buoyancy spar of the first fish cage sub-assembly to respective variable buoyancy spar of the second fish cage sub-assembly by pivot attachment of its bored flanges to respective bored protrusions of respective second hinge assemblies to pivotally interlink first fish cage sub-assembly to the second fish cage sub-assembly such that adjusting the buoyancy of the variable buoyancy spars by permitting ingress of water therein causes the variable buoyancy chambers to sink relative to the fixed buoyancy chambers and thereby pivot the first and the second fish cage sub-assemblies into an upright position to form a partially-built fish cage; and
    a third set of two interlinking members each interlinking member of the third set linking a variable buoyancy spar of the first fish cage sub-assembly to respective variable buoyancy spar of the second fish cage sub-assembly by attachment of its bored flanges to respective bored protrusions of respective first hinge assemblies.

2. The fish cage of claim 1 further comprising a first conduit connecting the water fitting to the water valve and a second conduit connecting the air fitting to the air valve, the water valve to communicate with a water source and the air valve to communicate with an air source.

3. The fish cage of claim 1 further comprising a walkway and a railing secured to the frame of the fish cage.

4. The fish cage of claim 1, further comprising an anchor means connected to one of the variable buoyancy spars.

5. The fish cage of claim 4 further comprising a winch means secured to one of the variable buoyancy spars and connected to the anchor means.

6. The fish cage of claim 4 wherein the anchor means includes a segmented anchor.

7. The fish cage of claim 1 further comprising a net secured to the variable buoyancy spars and to the interlinking members.

* * * * *